(12) United States Patent
Girard et al.

(10) Patent No.: US 8,654,340 B2
(45) Date of Patent: Feb. 18, 2014

(54) HETERODYNE DETECTION DEVICE FOR IMAGING AN OBJECT BY RE-INJECTION

(75) Inventors: Sylvain Girard, Verson (FR); Hervé Gilles, Bures-sur-Dives (FR); Mathieu Laroche, Cristot (FR)

(73) Assignees: Centre National de la Recherche Scientifique (CNRS), Paris (FR); Ecole Nationale Superieure d'Ingenieurs (ENSI), Caen (FR)

( * ) Notice: Subject to any disclaimer, the term of this patent is extended or adjusted under 35 U.S.C. 154(b) by 628 days.

(21) Appl. No.: 12/675,693

(22) PCT Filed: Sep. 3, 2008

(86) PCT No.: PCT/FR2008/001226
§ 371 (c)(1),
(2), (4) Date: Jul. 27, 2010

(87) PCT Pub. No.: WO2009/063145
PCT Pub. Date: May 22, 2009

(65) Prior Publication Data
US 2011/0211197 A1 Sep. 1, 2011

(30) Foreign Application Priority Data

Sep. 4, 2007 (FR) .................................... 07 06185

(51) Int. Cl.
*G01B 9/02* (2006.01)
(52) U.S. Cl.
USPC ............................ 356/484; 356/485; 356/489
(58) Field of Classification Search
USPC ................................................ 356/484–516
See application file for complete search history.

(56) References Cited

U.S. PATENT DOCUMENTS

| 4,947,034 A | | 8/1990 | Wickramasinghe et al. |
| 5,371,588 A | * | 12/1994 | Davis et al. .................... 356/489 |
| 5,835,199 A | * | 11/1998 | Phillips et al. ............... 356/5.03 |

(Continued)

FOREIGN PATENT DOCUMENTS

FR 2785045 A 4/2000

OTHER PUBLICATIONS

"Construction of a Broad-Band Optical Isolator by Using an Achromatic Circular Polarizer" (Tsermaa et al. Journal of the Korean physical society, vol. 48, No. 5, May 2006, pp. 892-896).*

(Continued)

*Primary Examiner* — Tarifur Chowdhury
*Assistant Examiner* — Sunghee Y Gray
(74) *Attorney, Agent, or Firm* — Harness, Dickey & Pierce, P.L.C.

(57) ABSTRACT

The disclosure relates to a detection device for imaging an object, that comprises: a laser cavity for transmitting an original light signal at an original wavelength towards the object in order to generate an evanescent wave at the surface of the object; a conversion means adapted for converting the evanescent wave into a progressive signal; a re-injection means adapted for injecting the progressive signal into the laser cavity in order to generate interference inside the laser cavity between the progressive signal and the original light signal; a detection means adapted for detecting the interference in order to determine the characteristics of the object; characterized in that the device includes a wavelength modification means adapted so that the wavelength of the progressive signal injected into the laser cavity is different from the original wavelength.

12 Claims, 3 Drawing Sheets

(56) References Cited

U.S. PATENT DOCUMENTS

| | | |
|---|---|---|
| 7,012,696 B2 * | 3/2006 | Orr et al. .................. 356/454 |
| 2004/0188602 A1 * | 9/2004 | Chinn et al. ............... 250/234 |
| 2006/0072875 A1 * | 4/2006 | Bhagavatula et al. ......... 385/30 |

OTHER PUBLICATIONS

Nesci et al. "Quantitative amplitude and phase measurement by use of a heterodyne scanning near-field optical microscope", Optics Letter, Opt. Soc. America USA, vol. 26, No. 4, Feb. 15, 2001, pp. 208-210, XP002461284, ISSN: 0146-9592.

Lacot E et al.: "Coherent laser detection by frequency-shifted optical feedback" Physical Review. A, American Physical Society; American Institute of Physics, New, US, vol. 64, No. 4, Oct. 2001, pp. 43815-1-11, XP002415797, ISSN: 1050-2947.

Han S K et al.: "Demonstration of the high-frequency optical heterodyne technology using near-field fiber-optic probes", Applied Physics Letters, AIP, American Institute of Physics, Melville, NY, US, vol. 75, No. 4, Jul. 26, 1999, pp. 454-456, XP01202426, ISSN: 0003-6951.

* cited by examiner

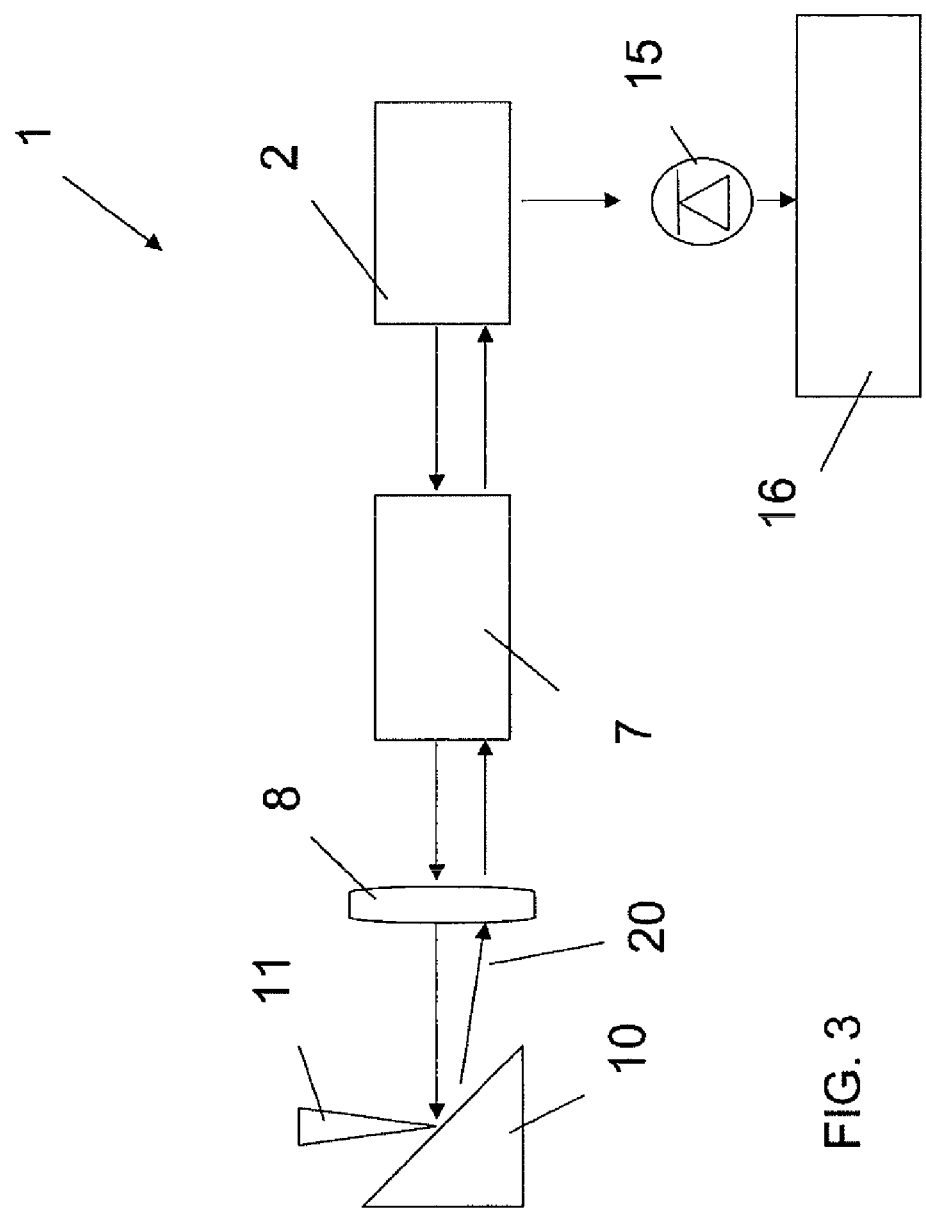

HETERODYNE DETECTION DEVICE FOR IMAGING AN OBJECT BY RE-INJECTION

CROSS-REFERENCE TO RELATED APPLICATIONS

This application is a National Phase Entry of International Application No. PCT/FR2008/001226, filed on Sep. 3, 2008, which claims priority to French Application 07/06185, filed on Sep. 4, 2007, both of which are incorporated by reference herein.

BACKGROUND AND SUMMARY

The invention relates to a detection device for the imaging of an object. The invention relates also to a detection method for the imaging of an object.

Detection devices and methods are known in the state of the art for the imaging of an object. Among detection devices for the imaging of an object, a distinction is made between far field detection devices and near field detection devices. It is known that the advantage of near field detection devices is to allow observation of objects of small dimensions, notably smaller than the size defined by the Rayleigh criterion.

The invention more particularly relates to a detection device for the imaging of an object in a near field. It relates to a detection device for the imaging of an object, comprising:
- a laser cavity adapted for emitting an original light signal at an original wavelength towards the object so as to generate an evanescent wave at the surface of the object;
- conversion means adapted for transforming the evanescent wave into a progressive signal having an output wavelength;
- re-injection means adapted for injecting the progressive signal into the laser cavity so as to generate interferences inside the laser cavity between the progressive signal and the original light signal;
- detection means adapted for detecting the interferences in order to determine at least one physical characteristic of the object.

Such a device is known from document FR-A-2785045. In this document, the re-injection into the laser cavity allows the cavity to be used as an interferometer, and the interferences generated in the cavity are used for measuring an amplitude of evanescent waves and therefore a measurement of the characteristics of the object may be obtained. In this document, detection of the interferences is a homodyne detection with which the amplitude of the evanescent waves may be determined. However, with such detection, it is not possible to obtain information on the phase of the evanescent wave. Consequently, certain characteristics of the object cannot be measured by the device described in the aforementioned document.

The problem solved by the invention is to improve the measurement of the evanescent wave generated at the surface of the object in a detection device for the imaging of an object. In particular, the problem solved by the invention is to be able to measure the phase of the evanescent wave generated at the surface of the object in a detection device for the imaging of an object. This problem is solved by the fact that the detection device for the imaging of an object described above comprises wavelength modification means adapted so that the wavelength of the progressive signal injected into the laser cavity is different from the original wavelength.

By these wavelength modification means, two signals with different wavelengths propagate in the laser cavity, which causes the generation of dynamic interferences in the form of heterodyne beats. Consequently, heterodyne detection of these beats is feasible by detection means. Unlike the re-injection device described earlier, the invention therefore allows access to the phase of the evanescent wave generated by the interaction between the original signal and the progressive signal from the object. The measurement of the characteristics of the object is therefore enhanced by the invention.

According to the invention, by generating heterodyne beats, it is possible to obtain better contrast upon detecting the amplitude and phase of the evanescent wave. It therefore allows measurements on the evanescent wave, even if the collected intensity of the evanescent wave is low. Still in this embodiment, the laser cavity may be capable of generating relaxation oscillations and, in this case, the wavelength modification means are adapted so that the difference between the output wavelength and the original wavelength allows these relaxation oscillations to be excited.

In this embodiment, when the laser cavity is capable of generating relaxation oscillations, notably when the laser is a laser of class B, the beat caused by the progressive signal injected into the laser cavity enters resonance with the relaxation oscillations, which allows a significant gain to be obtained on the detection of the amplitude and of the phase. This gain depends on the characteristics of the laser cavity of class B, and it may be of the order of one million notably for a laser cavity of the solid microlaser type. Still in this embodiment, the laser cavity may be adapted for emitting the original light signal in the infrared. The generation of the original light signal in the infrared has the advantage of allowing the use of highly developed standard telecommunication components. In particular, fiber optic components are current in this range of wavelengths. Further, this wavelength range is difficult to access with conventional interferometric setups.

According to an embodiment of the invention, the wavelength modification means comprise at least one acousto-optical modulator. In this case, the or each acousto-optical modulator has a preferential shift frequency and the combination of these accumulated shifts allows adjustment on the resulting shift for exciting the relaxation oscillations of the re-injected laser. According to an embodiment, the device may comprise a first optical isolator positioned in the path of the original light signal so as to avoid propagation of a parasitic reflected optical signal towards the laser cavity. This has the advantage of not interfering with the laser cavity in addition to the re-injection achieved by the device described above. In particular, this avoids reflections by lenses, by acousto-optical modulators or the object. In this case, the or each acousto-optical modulator is positioned after the first optical isolator.

Preferably, the device further comprises a second optical isolator positioned in the path of the progressive signal. In this case, the or each acousto-optical modulator may be positioned between the first optical isolator and the second optical isolator. According to an embodiment, the conversion means comprise a microtip. The invention also relates to a microscope comprising a detection device for the imaging of an object as described earlier.

The invention also relates to a detection method for the imaging of an object comprising steps in which:
- a laser cavity emits an original light signal at an original wavelength towards the object so as to generate an evanescent wave at the surface of the object;
- the evanescent wave is converted into a progressive signal;
- the progressive signal is injected into the laser cavity so as to generate interferences within the laser cavity between the progressive signal and the original light signal;

the interferences are detected so as to determine characteristics of the object,
wherein the wavelength of the progressive signal injected into the laser cavity is different from the original wavelength.

BRIEF DESCRIPTION OF THE DRAWINGS

At least one embodiment of the invention will now be described with reference to the appended figures wherein:

FIG. 3 illustrates a detection device for the imaging of an object according to another embodiment of the invention.

DETAILED DESCRIPTION

Figure 1:
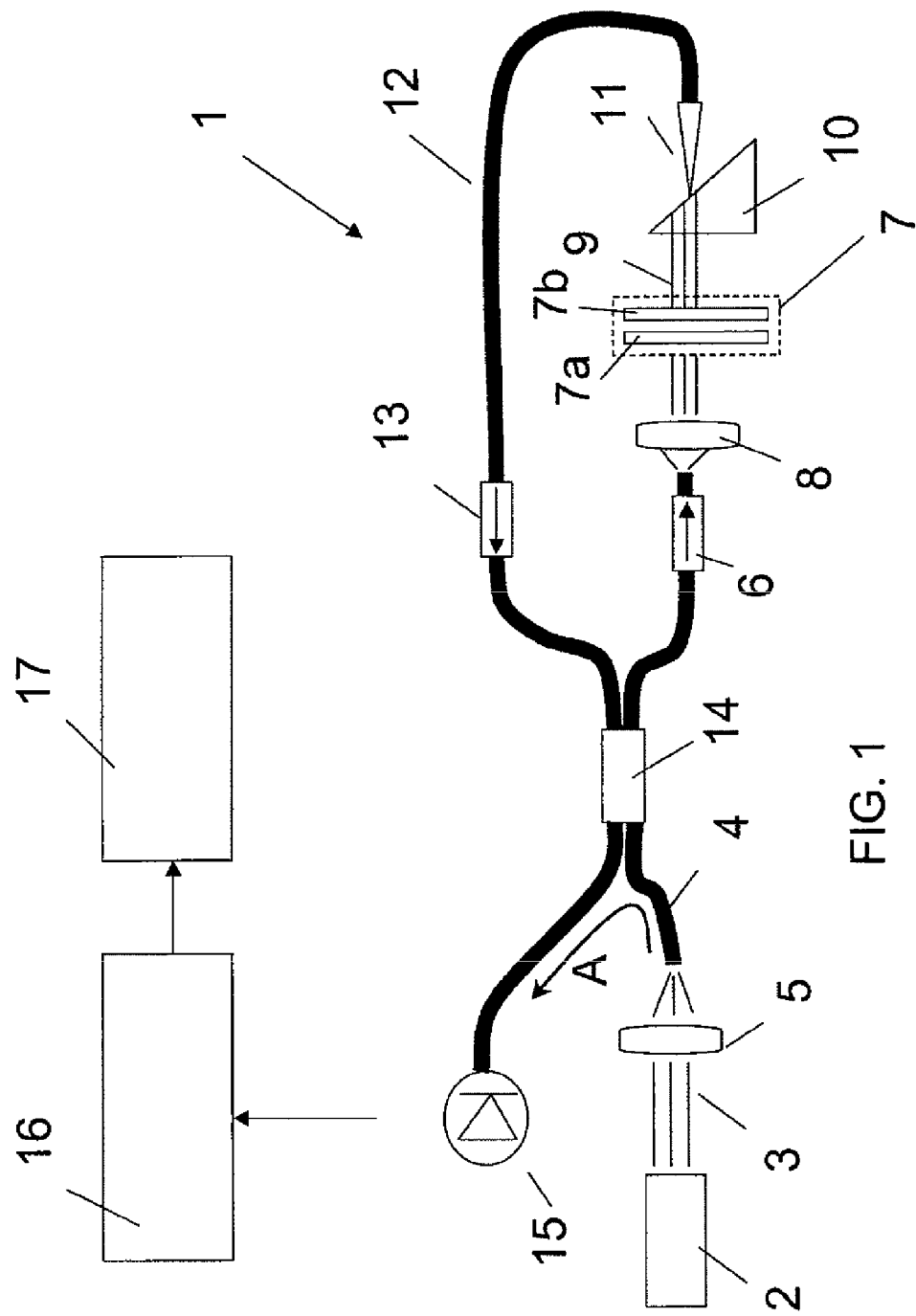
FIG. 1 illustrates a detection device for the imaging of an object according to an embodiment of the invention.

In the figures described earlier, identical references relate to similar technical elements. Illustrated in FIG. 1, a detection device 1 for the imaging of an object comprises a solid erbium-ytterbium glass laser cavity 2 of class B. The laser cavity 2 is pumped by a laser diode, not shown. The emission of the laser 2 may be made single-mode, longitudinally, by inserting an etalon in the cavity. At the output of the laser cavity 2, a laser beam 3 is emitted at the original wavelength $\lambda_1$ defined by the laser. For the aforementioned laser cavity, the original wavelength is set to 1.535 micrometers. The laser beam 3 is injected into an optical fiber 4 through a lens 5. An optical isolator 6 is positioned in the path of the laser beam 3 at the optical fiber 4 in order to avoid parasitic reflections of a signal towards the laser cavity 2.

In FIG. 1, the arrow in the optical isolator 6 indicates the direction of propagation of the laser beam 3 imposed by the optical isolator 6. At the output of the optical fiber 4, the laser beam 3 is then transmitted to a device based on an acousto-optical modulator 7 for example via a lens 8. By the device based on an acousto-optical modulator 7, the wavelength of the laser beam 3 is shifted in order to obtain a signal 9 with a wavelength $\lambda_2$, different from the wavelength $\lambda_1$. Following this shift, the signal 9 is transmitted towards an object 10. In FIG. 1, the object 10 is for example a silica prism. When the signal 9 is injected on one side of the prism 10, it undergoes total reflection on the hypotenuse of the prism 10 from the moment that the angle of incidence is greater than a limiting total reflection angle. For a silica prism at wavelength $\lambda_1$ of the laser beam 3, the limiting angle is equal to 43.8°. Following this reflection, an evanescent wave is generated on the illuminated surface of the prism 10. The evanescent wave is uniform over the illuminated surface and its amplitude decreases exponentially beyond the silica/air interface perpendicularly to the surface of the prism 10. It is possible to control the penetration depth of the evanescent wave by adjusting the angle of incidence beyond the limiting total reflection angle.

A microtip 11 is then used for converting the evanescent wave into a progressive wave. Such a microtip is known per se and may be obtained from a 1.53 micrometer single-mode silica optical fiber by drawing and chemical etching with hydrofluoric acid. The microtip 11 is oriented with an angle of 45° with respect to the normal incidence on the prism 10. The progressive signal collected by the microtip 11 is then re-injected towards the laser cavity 2 by means of an optical fiber 12 also comprising an optical isolator 13.

With a coupler 14, the progressive signal may be re-injected towards the laser cavity 2. A portion of the beam is taken by the coupler 14 at the output of the laser and transmitted towards a photodiode 15 as indicated by the arrow referenced as A. The photodiode 15 is for example a fiber InGaAs photodiode.

The signal photodetected by the photodiode 15 is demodulated at the heterodyne shift frequency determined from the wavelength difference $\lambda_2 - \lambda_1$. HF synchronous detection 16 performs the demodulation, by which information may be obtained both on the amplitude and phase of the optical signal sampled at a point-like area by the microtip 11. In order to be able to view the obtained results, the synchronous detection 16 may be connected to a digital oscilloscope 17. By moving the microtip 11 relatively to the surface of the prism 10, with the detected signal, it is then possible to obtain an amplitude and phase image, obtained point by point over a more extended area of the surface of the prism 10.

This scan of the microtip 11 over the surface of the prism 10 may be a scan along the axis of the microtip 11 or a transverse scan. With known servocontrol systems not shown, such scans may be performed with sufficient accuracy depending on the desired application. In particular, for example, it is possible to place the microtip 11 on a tuning fork vibrating around 32 kHz. Due to the shearing effects related to the interaction between the microtip 11 and the prism 10, the vibrational amplitude and frequency of the tuning fork then highly depend on the distance between the microtip 11 and the surface of the prism 10. By measuring the resonance frequency or amplitude and by maintaining either one of these quantities constant during the transverse movement, it is then possible to achieve servocontrol of the position. In this way, micrometer screws or piezoelectric wedges may be used for modifying the position of the microtip. Two-dimensional or three-dimensional images may therefore be produced.

Figure 2:
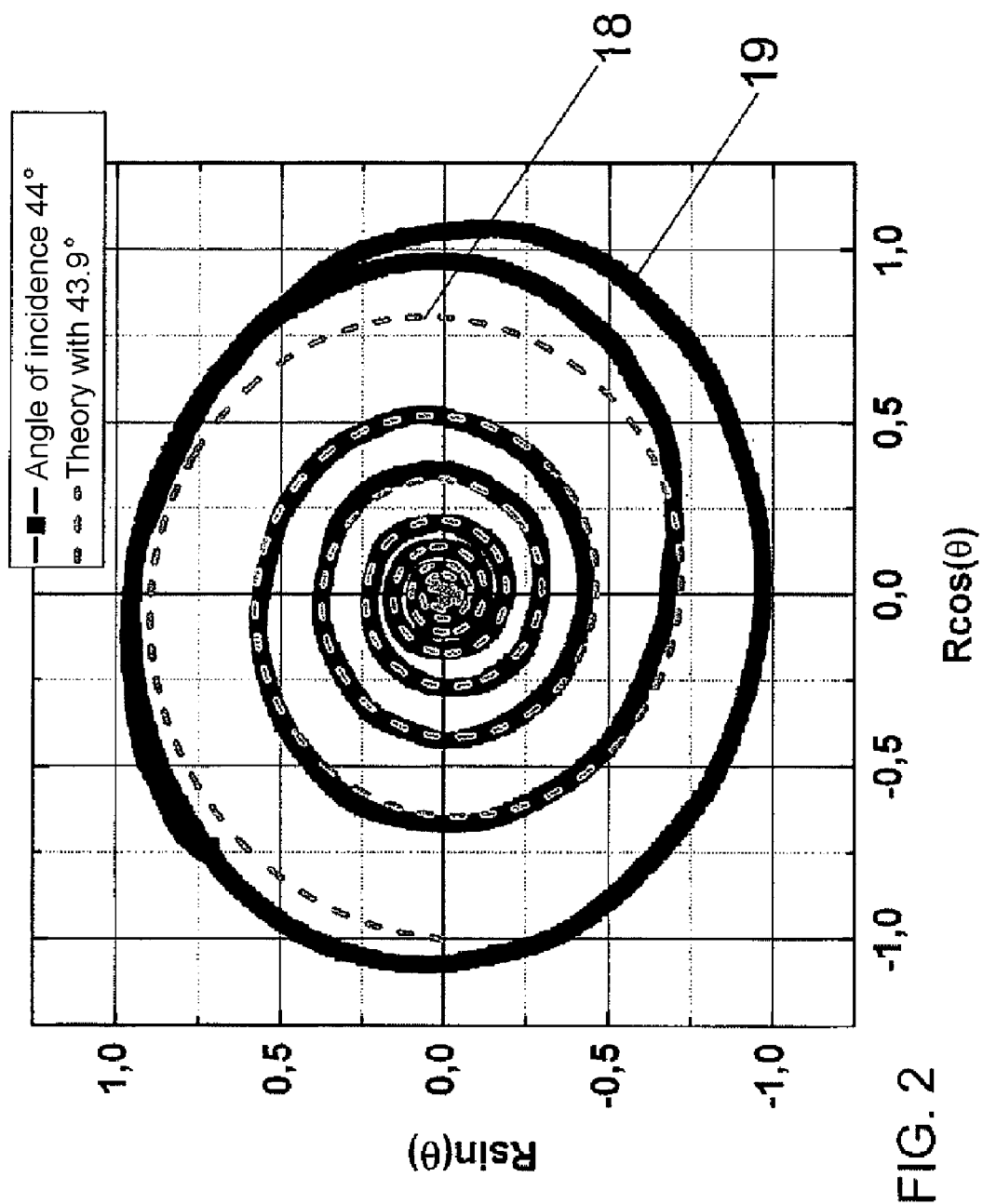
FIG. 2 illustrates a diagram of the time-dependent change of the amplitude and of the phase of the evanescent wave generated by the device illustrated in FIG. 1.

In order to demonstrate the reliability and stability of the simultaneous amplitude and phase measurements by the device 1 described earlier, a comparison between the theoretical variation of the amplitude and phase with the variation of the amplitude and phase of the detected signal on a planar diopter corresponding to the surface of the prism 10 and obtained by means of the device 1 described earlier, is illustrated in FIG. 2. To do this, the amplitude and the phase are viewed with a digital oscilloscope 17. The HF synchronous detection 16 is adjusted so as to provide at the output two signals in quadrature, X and Y, corresponding to the values R.cos(phi) and R.sin(phi), respectively, wherein R represents the amplitude of the detected signal of the prism 10, and phi represents the relative phase of this signal relatively to the reference provided by a signal for driving the device based on an acousto-optical modulator 7. Because of the inclination of the microtip 11 relatively to the prism, a spiral curve is theoretically expected to be obtained, as shown by the theoretical curve 18 of FIG. 2, the amplitude tending to 0 and the phase varying linearly. The experimental curve 19 obtained by means of the device 1 described earlier substantially corresponds to the theoretical curve 18. The consistency between the experimental measurements and the theoretical calculations therefore allows validation of the stability and reliability of the simultaneous but decoupled measurement of the amplitude and of the phase of the evanescent wave at the prism 10, by which the prism 10 may be easily imaged.

According to an embodiment of the invention, the device based on an acousto-optical modulator 7 and the laser cavity 2 are selected so that the frequency shift induced by the device based on an acousto-optical modulator 7 is equal to or close to the frequency of the relaxation oscillations of the laser cavity 2. This frequency of the relaxation oscillations of the laser cavity 2 is for example adjusted around 100 kHz, and the frequency shift induced by the device based on an acousto-optical modulator 7 is substantially equal to 100 kHz. It is noted that the frequency of the relaxation oscillations may easily be determined from the technical specification of a laser of class B.

As illustrated in FIG. 1, in order to obtain a frequency shift around a value of Δf=100 kHz, the device based on an acousto-optical modulator comprises two acousto-optical modulators 7a and 7b respectively positioned at order +1 and at order −1 with resonance frequencies respectively equal to 80 MHz+Δf and −80 MHz. In this way, both acousto-optical modulators 7a and 7b are excited around their resonance frequency by the laser cavity 2. Further, by positioning the two acousto-optical modulators 7a and 7b, the first acousto-optical modulator 7a shifts the original light signal to an optical frequency of about v1+80 MHz+Δf, and the second acousto-optical modulator 7b brings back this frequency to v1+Δf. Consequently, the frequency shift is well adapted to the relaxation oscillation of the laser while exciting the modulators around their resonance eigenfrequency in order to optimize their efficiency.

In this case, re-injection is such that it excites the relaxation oscillations which generate interferences as beats within the laser cavity 2. These beats are used by the synchronous detection 16 in order to obtain the amplitude and phase characteristics of the prism 10. In this case, it was demonstrated that a gain factor K of the order of 1 million ($10^6$) is obtained as compared to simple re-injection without any frequency shift. This gain factor K is substantially equal to the ratio between the radiative lifetime of the emitting level of the amplifier medium of the laser cavity 2 and the lifetime of the photons in the laser cavity 2. With such a gain factor, it is possible to obtain better contrast of the interferences induced by re-injection into the laser cavity 2, and therefore better sensitivity of the detection of the characteristics of the object 10 and better imaging of this object.

In the embodiment described earlier, a detection of the evanescent wave in transmission is used following the passing of the laser beam 3 through the prism 10. In FIG. 3, a reflection embodiment of the invention is illustrated.

According to this embodiment, illustrated in FIG. 3, the device 1 comprises a laser cavity 2 capable of emitting a laser beam 3 of wavelength $\lambda_1$ corresponding to an angular frequency $\omega_1$. The laser beam 3 passes through a device based on an acousto-optical modulator 7 capable of shifting the wavelength of the laser beam 3 to a wavelength $\lambda_2$ corresponding to an angular frequency $\omega_2$. As previously, the device based on an acousto-optical modulator 7 may comprise two acousto-optical modulators so that the shift frequency of the laser beam is adapted to the resonance frequency of the relaxation oscillations. The angular frequency shift between $\omega 2$ and $\omega 1$ is noted as $\Delta\omega$. The thereby generated signal 9 of wavelength $\lambda_2$ is sent via an objective lens 8 towards the object 10, the imaging of which is desired. At the object 10, an evanescent wave is generated. This evanescent wave is diffused by a microtip 11 as a reflected signal 20. This reflected signal 20 again undergoes a shift of $\Delta\omega$ upon passing through the device based on an acousto-optical modulator 7, and is re-injected into the laser cavity 2 so as to generate beats within the laser cavity 2. As in the embodiment described earlier with reference to FIG. 1, the device based on an acousto-optical modulator 7 and the laser cavity 2 are selected so that the frequency shift induced by the device based on an acousto-optical modulator 7 is equal to or close to the frequency of the relaxation oscillations of the laser cavity 2. Because of the double passage through the device based on an acousto-optical modulator 7, if the angular frequency of the relaxation oscillations of the laser cavity 2 is noted as $\Omega$, the device based on an acousto-optical modulator 7 is selected so that $2\cdot\Delta\omega=\Omega$.

The output signal of the laser is then transmitted via a separate route towards a photodetector 15 connected to a synchronous detection. With the synchronous detection 16, it is possible to detect the beats induced in the laser cavity 2 so as to determine the characteristics of the object 10. The intensity of these beats has the following form:

$$\Delta I = 2 \cdot K \sqrt{I_{ref} \cdot I_s} \cdot \cos(\Delta\omega + \phi_s)$$

wherein K is a value representing the gain provided by the re-injection, $I_{ref}$ is the intensity of the reference signal from the laser 2, $I_s$ is the intensity of the signal of the evanescent wave collected and then re-injected into the laser, and $\phi_s$ is the phase of this signal.

The gain factor may then be of the order of 1 million ($10^6$). It will be noted that the gain factor K is equal to 1 for a standard interferometric device of the Mach-Zender or Michelson type with a frequency shift for heterodyne detection. On the other hand, for re-injection devices, it may reach this value of 1 million depending on the laser cavity used.

Alternatives of the invention are now described. In the embodiments above, a laser source in the form of a solid laser cavity pumped by a diode was described. It is however possible to also use an integrated microlaser or a DFB fiber laser while retaining the same order of magnitude on the gain in sensitivity.

Further, a laser source emitting in the region of the near infrared, and notably at a wavelength of 1.535 micrometers, was described above. This wavelength range actually has the advantage of allowing measurements in transmission and of being well adapted to fiber optic components used in telecommunications. It is however understood that other wavelength ranges and other laser sources may be used.

The table below provides a list of exemplary lasers which may be used in the device of the invention. The first column of this table defines the type of laser used, the second column of this table defines the associated wavelength, the third column defines the gain factor K as defined above, and the fourth column defines the relaxation frequency for this laser.

| Laser | Wavelength (in micrometers) | Gain factor K | Relaxation frequency |
|---|---|---|---|
| Semi-conductor | 0.4 to 2 | $10^3$ | 1 GHz |
| $Nd^{3+}$:YAG | 1.064 | $1.5*10^4$ | 00 kHz |
| Microlaser | 1.064 | $1.25*10^6$ | 1 MHz |
| Y:Er:glass | 1.535 | $1.6*10^6$ | 100 kHz |
| Yb:Er:glass fiber (cavity length equal to 20 cm) | 1.535 | $1.9*10^7$ | 10 kHz |

Further, with reference to FIG. 1, a device based on acousto-optical modulators 7 is described, comprising two acousto-optical modulators positioned in the path of the original light signal, before the lens 8. It is understood that one of the two modulators or both modulators may be positioned after the object 10 in the path of the progressive signal. According to this alternative, the frequency modification function of the acousto-optical modulators is maintained independently of their position. The detection device described earlier associated with scanning means for the microtip, as mentioned earlier, may advantageously be used in a microscope of the SNOM (Scanning Near Field Optical Microscopy) type, or in microscopy by detection of the evanescent field.

The invention claimed is:

1. A near field detection device for the imaging of an object, the device comprising:
    a laser cavity adapted for emitting an original light signal at an original wavelength towards the object so as to generate an evanescent wave at the surface of the object;
    a converter operably converting the evanescent wave into a progressive signal;
    a re-injector operably injecting the progressive signal in the laser cavity so as to generate interferences within the laser cavity between the progressive signal and the original light signal;
    a detector operably detecting the interferences so as to determine at least one physical characteristic of the object;
    a wavelength modifier adapted so that the wavelength of the progressive signal injected into the laser cavity is different from the original wavelength;
    a first optical isolator positioned in the path of the original light signal so as to avoid propagation of a reflected optical signal towards the laser cavity; and
    wherein the re-injector further includes a second optical isolator positioned in the path of the progressive signal of the evanescent wave to prevent propagation of a reflected optical signal towards the converter.

2. The device according to claim 1, wherein the wavelength modifier shifts the wavelength of the original light signal before the light signal illuminates the object and thereby alters the wavelength of the progressive signal of the evanescent wave relative to the original wavelength.

3. The device according to claim 2, wherein the laser cavity generates relaxation oscillations and the wavelength modifier is adapted so that the difference between the output wavelength and the original wavelength allows excitation of these relaxation oscillations.

4. The device according to claim 1, wherein the laser cavity is a solid laser cavity of class B.

5. The device according to claim 1, wherein the laser cavity is adapted for emitting the original light signal in the infrared.

6. The device according to claim 1, wherein the wavelength modifier comprises at least one acousto-optical modulator.

7. The device according to claim 6, wherein the acousto-optical modulator has a shift frequency having a resonance, and wherein the combination of these shifts allows excitation of the relaxation oscillations of the re-injected laser.

8. The device according to claim 1, wherein the wavelength modifier comprises an acousto-optical modulator which is positioned after the first optical isolator.

9. The device according to claim 1, wherein the acousto-optical modulator is positioned between the first optical isolator and the second optical isolator.

10. The device according to claim 1, further comprising a vibrating tuning fork adapted for displacing the converter in the vicinity of the object.

11. The device according to claim 1, wherein the converter comprises a microtip.

12. A near field optical microscope comprising a detection device comprising:
    a laser cavity adapted for emitting an original light signal at an original wavelength towards the object so as to generate an evanescent wave at the surface of the object;
    a converter including a microtip positioned to operably sample the evanescent wave generated at the surface of the object and convert the evanescent wave into a progressive signal;
    a re-injector interconnecting the microtip and the laser cavity operably transmitting the progressive signal of the evanescent wave from the converter to the laser cavity and injecting the progressive signal of the evanescent wave into the laser cavity to generate interferences within the laser cavity between the progressive signal of the evanescent wave and the original light signal;
    a detector operably detecting the interferences so as to determine at least one physical characteristic of the object by analyzing the evanescent wave; and
    a wavelength modulator adapted so that the wavelength of the progressive signal injected into the laser cavity is different from the original wavelength.

* * * * *